Sept. 18, 1923.  H. G. SAAL  1,468,083
SPEED GOVERNING MECHANISM
Filed March 29, 1920
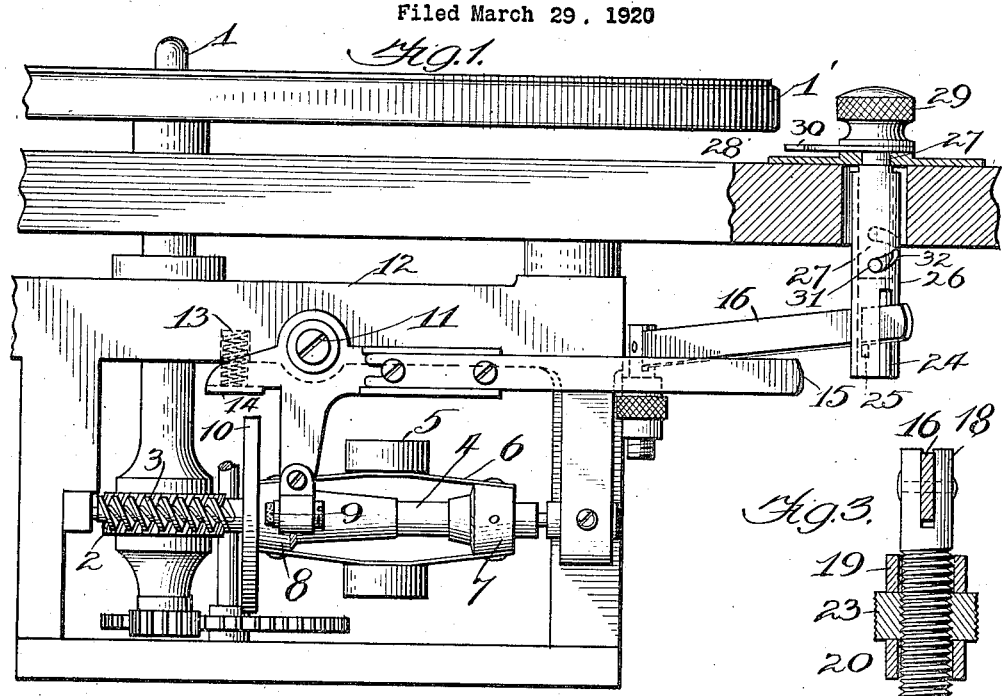
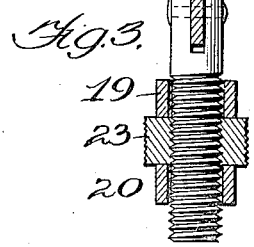
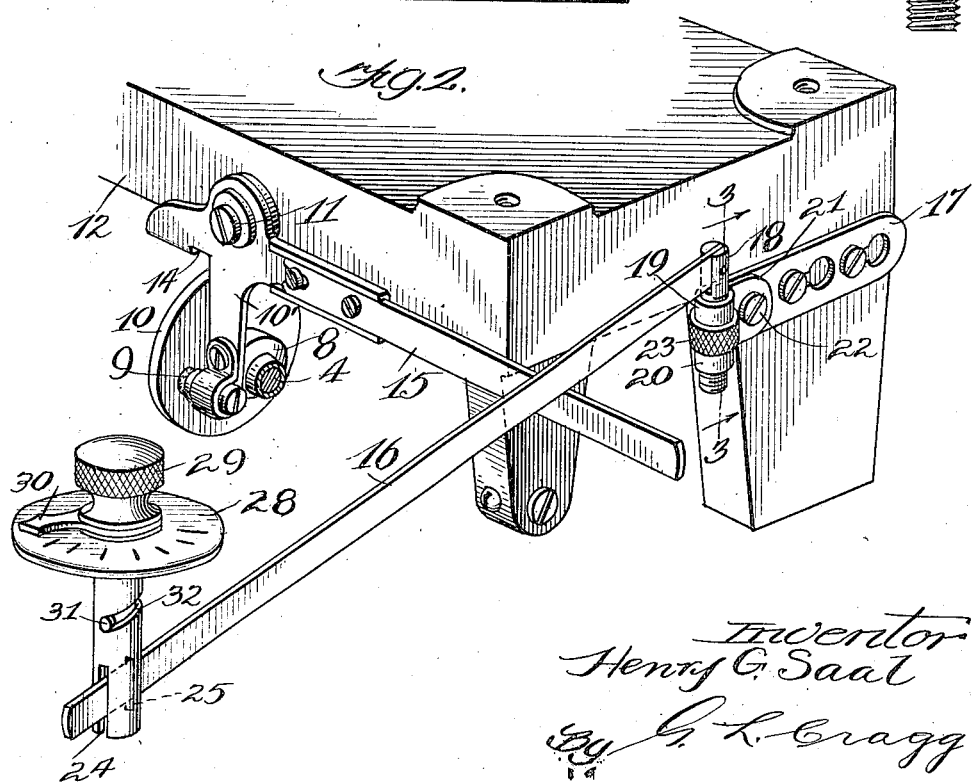
Inventor
Henry G. Saal
By G. L. Cragg
Atty.

Patented Sept. 18, 1923.

1,468,083

UNITED STATES PATENT OFFICE.

HENRY G. SAAL, OF CHICAGO, ILLINOIS.

SPEED-GOVERNING MECHANISM.

Application filed March 29, 1920. Serial No. 369,606.

*To all whom it may concern:*

Be it known that I, HENRY G. SAAL, citizen of the United States, residing at Chicago, in the county of Cook and State of Illinois, have invented a certain new and useful Improvement in Speed-Governing Mechanism, of which the following is a full, clear, concise, and exact description.

My invention relates to speed governing mechanism of the kind very commonly employed for controlling the speed of phonograph records.

The invention has for one of its objects an improvement in the articulation between an operating lever and a manually actuated speed gauge.

The invention has for another of its objects the provision of an improved mounting for one lever that crosses another which is connected with a speed governing brake element.

In carrying out the first object of my invention the operating lever is entered into the slot formation of a sleeve which is adjustable to position this lever. In carrying out the second object of my invention the lever which crosses and is in actuating relation to a co-operating lever is connected with a bracket by means of a pin that has a changeable place of engagement with one of these parts, preferably the lever, to bring such lever nearer to or further from the bracket. The part with which the pin has changeable place of engagement is desirably provided with means for clamping the pintle in the selected adjustment thereof.

I will explain my invention more fully by reference to the accompanying drawing showing the preferred embodiment thereof and in which Fig. 1 is a view in elevation, partially in section, of enough of a phonograph equipment to illustrate the nature of my invention; Fig. 2 is a perspective view of a part of the structure shown in Fig. 1; and Fig. 3 is a sectional view on line 3—3 of Fig. 2.

Like parts are indicated by similar characters of reference throughout the different figures.

The governor illustrated is shown as being associated with a shaft 1 that is adapted for the operation of a turn table 1' for supporting a disc phonographic record, this shaft supporting a worm wheel 2 engageable by a worm 3 provided upon the governor shaft 4. In accordance with common practice the shaft 1 is driven by a spring motor through gearing, the gear wheel 2 being added in order that the shaft 1 may drive the worm 3 to rotate the governor shaft 4 for the purpose of operating the centrifugal governor 5 to maintain the speed of the turn table 1' substantially constant. This centrifugal governor is of common form, the weights thereof being mounted upon intermediate portions of the resilient strips 6. Each of these resilient strips is mounted at one end upon a sleeve 7 rigidly secured to the shaft 4, the other end of said resilient strip being connected with a collar 8 that is movable along the shaft 4 and with respect to the brake element or pad 9. The collar 8 is in fixed relation to the brake disc or rotatable brake element 10 which engages the pad 9 when the governor shaft 4 reaches a predetermined speed whereby the speed of the turn table shaft 1 is controlled.

In the embodiment of the invention illustrated the brake pad 9 constitutes the normally stationary brake element, this pad, however, being desirably mounted at one end of one arm of the bell crank 10' which is pivotally mounted at 11 on the frame 12. A spring 13 is received in a recess in the frame 12, the projecting end of the spring engaging the ledge 14 upon the other end of the bell crank 10'. This spring operates yieldingly to hold the brake pad in its normally fixed position. A lever 15 is connected with the bell crank, the position of this lever being manually adjusted, by mechanism to be described, to fix the position to which the spring 13 is adapted to normally place the brake pad 9.

The operating lever 16 crosses and engages the lever 15. A bracket 17 is mounted upon the base 12. A pin or pintle 18 brings the lever 16 into hinged connection with the bracket 17, the lever 16 being preferably in permanent pivotal connection with said pintle whose place of engagement with the bracket is changeable longitudinally of the pintle axis to bring the fulcrumed end of the lever nearer to or further from the bracket to adjust or calibrate the relation of the levers 15 and 16.

In the preferred embodiment of the invention the pintle is slipped through two aligned spaced apart eyes 19, 20. These eyes are preferably formed with the bracket from one piece of strip spring metal, the eyes being split so as to be contractible and expansible. Parts of these eyes where margining the split thereof are joined by a yoke 21 that is penetrated by the stem of a clamping screw 22 that is in threaded connection with the bracket but not with said yoke. The screw engages the yoke so that when the screw is tightened the yoke will be brought closer to the bracket to contract the eyes into clamping engagement with the pintle to secure the pintle in its adjusted position. In adjusting the parts, the pintle is loose and is permitted to turn, whereby the lever 16 is permitted to assume its slant.

As an easy means for shifting the pintle longitudinally of its axis, I thread the same and place thereon a nut 23 in threaded engagement therewith and which is confined in the space between the eyes 19, 20. The eyes confine the nut to a single plane of rotation so that the pintle is moved longitudinally of its axis when the nut is turned and the clamping screw 22 is loosened. When the desired position of the pintle has been selected the clamping screw 22 is tightened to hold the pintle in fixed relation with the bracket.

The lever 16, being fulcrumed upon the pintle, may be swung thereon to adjust the position to which the spring 13 may raise the lever 15 in order to determine the adjusted position of the brake pad 9. The outer end of the lever 16 passes through the diametrically opposite slots 24, 25 formed in the lower end of the sleeve 26. The rotatable shaft 27 is confined to a fixed plane of rotation by means of a collar 28 received within an annular recess in the shaft and between a larger portion of the shaft and the knurled thumb and finger piece 29 fixed upon the shaft. The collar 28 may serve as a gauge plate and the knurled thumb and finger piece 29 may carry the pointer 30 to indicate to the adjuster the speed that may be secured by turning said shaft. The shaft, being thus confined to a single plane of rotation, is brought into cam engagement with the sleeve 26 to force the longitudinal movement of the latter up and down to elevate or depress the outer end of the lever 16 and thereby further adjust the position to which the spring 13 may elevate the lever 15 to determine the speed regulating position of the pad 9. Cam connection between the shaft 27 and the sleeve 26 desirably resides in a pin 31 upon the shaft that enters a spiral cam groove or slot 32 in the sleeve.

When the bracket is adjustable lengthwise thereof as illustrated, the pin 18 functions as a pintle to permit modification of the angularity of the bracket and lever 16. I do not limit myself, however, to the pin 18 functioning as a pintle.

While I have herein shown and particularly described the preferred embodiment of my invention I do not wish to be limited to the precise details of construction shown as changes may readily be made without departing from the spirit of my invention, but having thus described my invention I claim as new and desire to secure by Letters Patent the following:—

1. Speed governing mechanism including a driven brake element; another brake element complemental to the aforesaid brake element; mechanism for changing the relative positions of said brake elements, inclusive of a lever connected with one of said brake elements; an operating lever crossing and engaging the other lever; a threaded pin in connection with said operating lever; a bracket carrying two aligned spaced apart split contractible and expansible eyes receiving the pin that is in sliding and turning engagement with the eyes; a nut in the space between said eyes and in threaded engagement wtih said pin; and a screw upon the bracket and positioned to contract said eyes when suitably turned, whereby the eyes may be clamped upon the pin.

2. Speed governing mechanism including a driven brake element; another brake element complemental to the aforesaid brake element; mechanism for changing the position of one of said elements with respect to the other inclusive of a lever connected with one of said brake elements; an operating lever crossing and engaging the other lever; a threaded pin in connection with said operating lever; a bracket in which said pintle may turn; and a nut assembled with the bracket and in threaded engagement with the pin.

In witness whereof, I hereunto subscribe my name this 25th day of March, A. D. 1920.

HENRY G. SAAL.